(12) United States Patent
O'Keefe et al.

(10) Patent No.: US 7,732,554 B2
(45) Date of Patent: Jun. 8, 2010

(54) PROCESS FOR PREPARING A CURABLE SILYLATED POLYURETHANE RESIN

(75) Inventors: Brendon J. O'Keefe, Parkersburg, WV (US); Holger J. Glatzer, Leverkusen (DE); Misty W. Huang, New City, NY (US); Christine Lacroix, Ornex (FR)

(73) Assignee: Momentive Performance Materials Inc., Albany, NY (US)

( * ) Notice: Subject to any disclaimer, the term of this patent is extended or adjusted under 35 U.S.C. 154(b) by 811 days.

(21) Appl. No.: 11/524,844

(22) Filed: Sep. 21, 2006

(65) Prior Publication Data

US 2008/0076899 A1    Mar. 27, 2008

(51) Int. Cl.
*C08G 77/04*    (2006.01)
*C08G 18/00*    (2006.01)

(52) U.S. Cl. .................... 528/28; 528/29; 528/44
(58) Field of Classification Search .......... 528/28, 528/29, 44
See application file for complete search history.

(56) References Cited

U.S. PATENT DOCUMENTS

| | | | |
|---|---|---|---|
| 3,627,722 A * | 12/1971 | Seiter ................... 524/869 |
| 3,632,557 A * | 1/1972 | Brode et al. ............. 528/28 |
| 3,686,146 A * | 8/1972 | Goto et al. .............. 528/66 |
| 4,345,053 A * | 8/1982 | Rizk et al. ........... 525/440.03 |
| 4,374,237 A * | 2/1983 | Berger et al. ............ 528/28 |
| 4,446,292 A * | 5/1984 | Chang et al. ............ 528/29 |
| 4,468,492 A * | 8/1984 | Piccirilli et al. .......... 525/102 |
| 4,857,623 A * | 8/1989 | Emmerling et al. ........ 528/28 |
| 4,910,332 A * | 3/1990 | Kahl et al. .............. 560/351 |
| 5,068,304 A * | 11/1991 | Higuchi et al. ........... 528/28 |
| 5,147,927 A * | 9/1992 | Baghdachi et al. ....... 524/710 |
| 5,225,512 A * | 7/1993 | Baghdachi et al. ........ 528/28 |
| 5,272,224 A * | 12/1993 | Baghdachi et al. ....... 525/460 |
| 5,368,943 A * | 11/1994 | Baghdachi et al. ...... 428/423.1 |
| 5,525,654 A * | 6/1996 | Podola et al. ............ 524/199 |
| 5,539,045 A | 7/1996 | Potts et al. |
| 5,554,709 A * | 9/1996 | Emmerling et al. ........ 528/27 |
| 5,643,581 A * | 7/1997 | Mougin et al. ........... 424/401 |
| 5,900,458 A * | 5/1999 | Fujita et al. ............. 524/788 |
| 5,990,257 A | 11/1999 | Johnston et al. |
| 6,197,912 B1 * | 3/2001 | Huang et al. ............. 528/28 |
| 6,265,517 B1 | 7/2001 | Stuart |
| 6,319,311 B1 * | 11/2001 | Katz et al. ........... 106/287.11 |
| 6,401,925 B1 | 6/2002 | Wang et al. |
| 6,498,210 B1 | 12/2002 | Wang et al. |
| 6,596,819 B2 * | 7/2003 | Morikawa et al. ......... 525/457 |
| 6,989,429 B2 | 1/2006 | Feng |
| 2002/0088583 A1 * | 7/2002 | Doi et al. ............... 162/164.1 |
| 2003/0083427 A1 * | 5/2003 | Doi et al. ............... 524/589 |
| 2003/0092932 A1 * | 5/2003 | Tong et al. .............. 560/352 |
| 2003/0232950 A1 | 12/2003 | Roesler et al. |
| 2004/0072921 A1 | 4/2004 | Stanjek et al. |
| 2004/0087752 A1 * | 5/2004 | Schindler et al. .......... 528/25 |
| 2004/0204539 A1 * | 10/2004 | Schindler et al. ......... 524/588 |
| 2005/0032973 A1 * | 2/2005 | Krebs et al. ............. 524/589 |
| 2005/0075469 A1 * | 4/2005 | Feng ..................... 528/44 |
| 2005/0119436 A1 * | 6/2005 | Ziche et al. ............. 528/29 |
| 2006/0175009 A1 * | 8/2006 | Krebs et al. ............ 156/331.7 |
| 2006/0189705 A1 * | 8/2006 | Stanjek et al. ........... 521/154 |
| 2006/0293480 A1 * | 12/2006 | Landon et al. ............ 528/28 |
| 2007/0055035 A1 | 3/2007 | Ludewig et al. |
| 2008/0057316 A1 * | 3/2008 | Landon et al. ........... 428/423.1 |

FOREIGN PATENT DOCUMENTS

EP    0 931 800    7/1999
WO    2007/025667    3/2007

OTHER PUBLICATIONS

U.S. Appl. No. 11/260,598, filed Oct. 27, 2005, Misty Huang.

* cited by examiner

*Primary Examiner*—Randy Gulakowski
*Assistant Examiner*—Robert Loewe
(74) *Attorney, Agent, or Firm*—Dominick G. Vicari; Joseph S. Ostroff

(57) ABSTRACT

The present invention relates to a process for the production of silylated polyurethane resins free of unreacted residual isocyanate possessing consistent viscosity and stability and products therefrom.

24 Claims, 3 Drawing Sheets

PROCESS FOR PREPARING A CURABLE SILYLATED POLYURETHANE RESIN

The present invention relates to a process for the manufacture of silylated polyurethane resins with consistent viscosity and improved viscosity stability. More particularly, the present invention is directed to a process for the production of silylated polyurethane resins possessing consistent viscosity and stability that is free of unreacted residual isocyanate.

BACKGROUND OF THE INVENTION

Silylated polyurethane resins are useful as coatings, adhesives, sealants and industrial elastomeric goods and can be prepared from polyols and isocyanatosilanes. Silylated polyurethane resins can be prepared by known methods. One such method is disclosed by Johnston, U.S. Pat. No. 5,990,257, wherein the resin is prepared by the reaction of a polyol and a diisocyanate to form hydroxyl terminated prepolymer followed by the addition of an isocyanatosilane. Another suitable method for the preparation of silylated polyurethane resin is taught by Huang in published U.S. patent application Ser. No. 11/260,598, by which the isocyanatosilane may be added to the reaction mixture of polyol and diisocyanate before all of the diisocyanate has been reacted. Resins prepared by these and other methods may contain small amounts of residual isocyanate, whether inadvertently or by design.

When preparing silylated polyurethane resins, typically there is a hydroxyl functional group for every isocyanate group so that at the completion of the reaction there should be no residual isocyanate. In reality small amounts of isocyanate and hydroxyl groups remain when the manufacturing process is complete because the reactions proceed to completion very slowly due to the low levels of reactants. Thus, the small amount of residual isocyanate slowly reacts over time with the residual hydroxyl-terminated polymer resulting in an undesirable increase in product viscosity. Alternatively, to ensure that all of the isocyanate has reacted the reaction mixture can be held under reaction conditions for a prolonged period of time, during which the viscosity may increase to an undesirable level and the viscosity may vary significantly from batch-to-batch. During the production of silylated polyurethane resins it is difficult to ensure that all of the isocyanate has reacted with the hydroxyl-terminated polymer.

Resins free of isocyanates are desirable because isocyanates are toxic and present health risks, and because even small levels of residual isocyanate in the resin can cause viscosity instability, i.e. the viscosity of the resin can increase on storage after manufacture due to the slow reaction of the residual isocyanate. Efforts to "react out," or remove all of the isocyanate can result in resins that have viscosity variability from batch-to-batch.

There remains a need in the industry for a process to manufacture silylated polyurethane resin that is free of residual isocyanate and provides consistent viscosity and viscosity stability.

SUMMARY OF THE INVENTION

Figure 1:
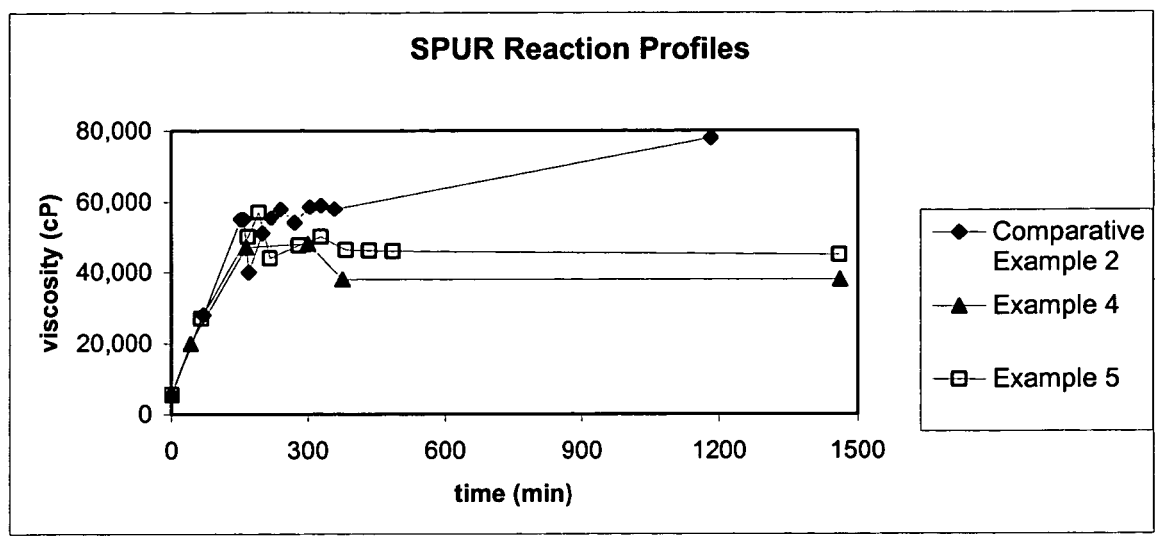
FIG. 1 is a graphical representation of the viscosity stability of silylated polyurethane resins of Comparative Example 2 and Examples 4 and 5.

The present invention discloses a process for preparing silylated polyurethane resins that are free of isocyanate. More particularly, the present invention is directed to a process for preparing a curable silylated polyurethane resin which comprises:

a) silylating hydroxyl-terminated polyol polymer with isocyanatosilane to provide silylated polyurethane containing residual isocyanate; and, b) scavenging isocyanate present in the silylated polyurethane with at least one isocyanate-reactive scavenging agent to provide silylated polyurethane resin of reduced isocyanate content, the silylated polyurethane resin of reduced isocyanate content resulting from step (b) possessing a viscosity following aging which is less than that of the isocyanate-containing silylated polyurethane resin resulting from step (a) following the same conditions of aging.

Furthermore, the present invention discloses a curable silylated polyurethane resin of reduced isocyanate content resulting from the process disclosed herein having consistent viscosity and improved viscosity stability. The silylated polyurethane resin of the present invention is especially useful for the manufacture of sealants, coatings, adhesives, gaskets, and the like.

DETAILED DESCRIPTION OF THE INVENTION

The present invention relates to a process for the manufacture of curable silylated polyurethane resin compositions that are substantially free of residual amounts of isocyanate. The process for preparing curable silylated polyurethane resin of the present invention is accomplished by reaction with an isocyanate-reactive scavenging agent.

The curable silylated polyurethane resin of the present invention, in general can be obtained by reacting a hydroxyl-terminated polymer with a suitable isocyanate-terminated silane, e.g., one possessing one to three alkoxy groups bonded to the silicon atom. The details of these reactions, and those for preparing the hydroxyl-terminated polymers employed therein can be found in, amongst others: U.S. Pat. Nos. 3,786, 081 and 4,481,367 (hydroxyl-terminated polymers); and, U.S. Pat. Nos. 4,345,053, 4,625,012, 6,833,423 and published U.S. Patent Application 2002/0198352 (curable silylated polyurethane resin obtained from reaction of hydroxyl-terminated polyurethane prepolymer and isocyanatosilane). The entire contents of the foregoing U.S. patent documents are incorporated by reference herein.

The curable silylated polyurethane resin of the present invention may be obtained by reacting isocyanatosilane directly with hydroxyl-terminated polyol. By the expression "hydroxyl-terminated polyol" is meant liquid polyols possessing at least two terminal hydroxyl groups and whose chain optionally includes two or more urethane linkages. Thus, the hydroxyl-terminated polyols employed in the process of this invention include polyether polyols, polyester polyols such as the hydroxyl-terminated polycaprolactones, polyetherester polyols such as those obtained from the reaction of polyether polyol with ε-caprolactone, polyesterether polyols such as those obtained from the reaction of hydroxyl-terminated polycaprolactones with one or more alkylene oxides such as ethylene oxide and propylene oxide, hydroxyl-terminated polybutadienes and hydroxy-terminated polyurethane prepolymers derived therefrom, e.g., by the reaction of a slight excess of one or a mixture of said polyols with one or a mixture of polyisocyanates.

Specific suitable polyols include the polyether diols, in particular, the poly(oxyethylene)diols, the poly(oxypropylene)diols and the poly(oxyethylene-oxypropylene)diols, polyoxyalkylene triols, polytetramethylene glycols, polyacetals, polyhydroxy polyacrylates, polyhydroxy polyester amides and polyhydroxy polythioethers, polycaprolactone diols and triols, and the like. In one embodiment of the present invention, the polyols used in the production of the silylated polyurethane resins are poly(oxyethylene)diols with number average molecular weights from about 500 to about 25,000 grams per mole (g/mol). In another embodiment of the present invention, the polyols used in the production of the silylated polyurethane resins are poly(oxypropylene)diols with number average molecular weights from about 1,000 to about 20,000 grams per mole. Mixtures of polyols of various structures, molecular weights and/or functionalities can also be used.

The polyether polyols can have specifically functionality up to about 8 hydroxyl groups per polymer chain and more specifically have a functionality of from about 2 to 4 hydroxyl groups per polymer chain and most specifically, a functionality of 2 hydroxyl groups per polymer chain (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505; 3,941,849; 4,242,490; 4,335,188; 4,687,851; 4,985,491; 5,096,993; 5,100,997; 5,106,874; 5,116,931; 5,136,010; 5,185,420; and 5,266,681, the entire contents of which are incorporated here by reference. Polyether polyols produced in the presence of double-metal cyanide catalysts tend to have high molecular weights and low levels of unsaturation, properties of which, it is believed, are responsible for the improved performance. The polyether polyols specifically have a number average molecular weight of from about 1,000 to about 25,000 grams per mole, more specifically from about 2,000 to about 20,000 grams per mole, and even more specifically from about 4,000 to about 18,000 grams per mole. In one embodiment of the invention, the polyether polyols have an end group unsaturation level of no greater than about 0.04 milliequivalents per gram of polyol. In another embodiment of the invention, the polyether polyol has an end group unsaturation of no greater than about 0.02 milliequivalents per gram of polyol. In yet another embodiment of the invention, these polyols can be prepared by the reaction of the same or different hydroxyl-terminated polymers with a di- or polyisocyanate to increase the molecular weight of the polyols. The ratio of hydroxyl groups to isocyanate groups is specifically from about 1.01 to about 3 and more specifically from about 1.05 to about 1.50. Polyols prepared by the reaction of hydroxyl-terminated polymers with di- or polyisocyanates may contain residual isocyanate, either from partially reacted di- or polyisocyanate, or from unreacted di- or polyisocyanate. In still another embodiment, the molecular weight of the polyols can be increased by reacting them and low molecular weight glycols, triols or higher functionality alcohols, di- or polyamines, polysiloxanes containing pendent and/or terminal hydroxyl or amino groups with di- or polyisocyanates.

Examples of commercially available polyols include the Arcol® polyol family and the Acclaim® polyol family of polyether polyol products which are used in a variety of urethane applications, such as, for example, adhesives, sealants, elastomers, molded foams and flexible foams. The Arcol® product line includes diol, triol and polymer polyols possessing number average molecular weights that vary from less than 300 to as much as 6,000 grams per mole. The Acclaim® polyol family of polyether polyol products which are also used in a variety of polyurethane and other applications, such as, for example, cast elastomers, adhesives and sealants, epoxy flexibilizers, defoamers, lubricants, crude oil de-emulsifiers and plasticizers. The Acclaim® polyols contain extremely low levels of unsaturation. The Acclaim® product line includes diol, triol and polymer polyols possessing number average molecular weights that vary from as low as 700 to as much as 12,000 grams per mole.

Any of numerous polyisocyanates, advantageously, diisocyanates, and mixtures thereof, can be used to provide the hydroxyl-terminated polyurethane prepolymers. In one embodiment, the polyisocyanate can be diphenylmethane diisocyanate ("MDI"), polymeric diphenylmethane diisocyanate ("pMDI"), paraphenylene diisocyanate, naphthalene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof. In one embodiment of the invention the diisocyanate is at least one member selected from the group consisting of hexamethylene diisocyanate, phenylene diisocyanate, toluene diisocyanate, 4,4'-diphenylmethane diisocyanate and various isomers thereof, isophorone diisocyanate, dicyclohexylmethane diisocyanate, cyclohexane diisocyanate and 1,3-bis-(isocyanatomethyl)cyclohexane.

A catalyst will ordinarily be used in the preparation of the hydroxyl-terminated polyurethane prepolymers. These catalysts are employed to increase the reaction rates of the hydroxyl-terminated polymers with the di- or polyisocyanatosilanes. Suitable catalysts include the dialkyltin dicarboxylates such as dibutyltin dilaurate and dibutyltin diacetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium complex KAT XC6212, K-KAT XC-A209 available from King Industries, Inc., aluminum chelate TYZER® types available from DuPont Company, and KR types available from Kenrich Petrochemical, Inc., and other compounds of metals, such as Bi, Zr, Zn, Co, Ni, and Fe, and the like.

Curable Silylated Polyurethane Resin Obtained from Hydroxyl-Terminated Polymers

The curable silylated polyurethane resin can, as previously indicated, be prepared by reacting a hydroxyl-terminated polymer with an isocyanatosilane.

Useful silylation reactants for the hydroxyl-terminated polymers are those containing isocyanate groups and readily hydrolyzable functionality, e.g., 1 to 3 alkoxy groups bonded to the silicon. Suitable silylating reactants are the isocyanatosilanes of the general formula:

$$OCN-R^1-Si(R^2)_y(OR^3)_{3-y} \quad (1)$$

wherein $R^1$ is a divalent hydrocarbon radical containing from about 1 to about 12 carbon atoms, optionally containing one or more heteroatoms; each occurrence of $R^2$ is independently the same or different monovalent hydrocarbon radical of from about 1 to about 8 carbon atoms; each occurrence of $R^3$ is independently the same or different monovalent hydrocarbon radical group of up to 6 carbon atoms and y is 0, 1 or 2.

Representative non-limiting examples of $R^1$ are alkylene groups, such as methylene, ethylene, propylene, butylenes, isobutylene, 3-oxa-hexylene, and dodecylene; arylene groups, such as phenylene; aralkylene groups, such as 1,4-bis-(methylene)benzene, and 1,4-bis-(ethylene)benzene.

Representative non-limiting examples of $R^2$ and $R^3$ are alkyl, such as methyl, ethyl, propyl, isopropyl, tert-butyl, hexyl, and octyl; aryl, such as phenyl, 4-ethylphenyl; aralkyl, such as benzyl, and 2-phenylethyl.

Specific isocyanatosilanes that can be used herein to react with the foregoing hydroxyl-terminated polymers to provide silylated polyurethane resins include 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanatomethyltrimethoxysilane, 3-isocyanatopropyltriethoxysilane, 2-isocyanato-2-methylethyltriethoxysilane, 4-isocyanatobutyltriethoxysilane, 2-isocyanato-1,1-dimethylethyltriethoxysilane, 1-isocyanatomethyltriethoxysilane, 3-isocyanatopropylmethyldimethoxysilane, 3-isocyanatopropyldimethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane, 1-isocyanatomethylmethyldiethoxysilane, and the like.

The curable silylated polyurethane resins of the present invention can be obtained from one or more polyols, advantageously, diols, reacting directly with isocyanatosilane without the initial formation of a polyurethane prepolymer. The materials, i.e., polyols and silanes (e.g., one possessing both hydrolyzable and isocyanato functionality), useful for this approach to producing silylated polyurethane resin are described above. As such, suitable polyols include, hydroxyl-terminated polyols having specifically a number average molecular weight from about 100 to 25,000 grams/mole and more specifically from about 200 to about 20,000 grams per mole and most specifically from about 4,000 to about 18,000 grams per mole. However, mixtures of polyols of various structures, molecular weights and/or functionalities can also be used. Suitable isocyanatosilanes used to react with the foregoing polyols to provide silylated polyurethane resins are described above.

Other suitable methods for the preparation of curable silylated polyurethane resin are contemplated herein and include, e.g., isocyanatosilane added to a reaction mixture of polyol and diisocyanate before all of the diisocyanate has been reacted. As well as any functionally terminated polyurethane prepolymer that can be silylated for purposes of preparing silylated polyurethane resin. Resins prepared by these and other methods may contain small amounts of residual isocyanate, whether inadvertently or by design. Removal of these residual amounts of isocyanate can be accomplished by reaction with an isocyanate-reactive scavenging agent more fully described herein below.

The urethane prepolymer synthesis and subsequent silylation reaction, as well as the direct reaction of polyol and isocyanatosilane are conducted under anhydrous conditions and preferably under an inert atmosphere, such as a blanket of nitrogen, to prevent premature hydrolysis of the alkoxysilane groups. Typical temperature range for both reaction steps, is specifically from about 0° to about 200° C., and more specifically from about 60° to about 90° C. Typically, the total reaction time for the synthesis of the silylated polyurethane is between 4 and 20 hours, though synthesis can take longer depending on the chosen conditions.

According to one embodiment of the invention, the isocyanatosilane is at least one member selected from the group consisting of 3-isocyanatopropyltrimethoxysilane, 3-isocyanatopropyltriethoxysilane, 1-isocyanatomethytrimethoxysilane, and 1-isocyanatomethylmethyldimethoxysilane.

The isocyanate-reactive scavenging agent of the present invention is an agent possessing at least one active hydrogen. Moreover, the isocyanate-reactive scavenging agent of the present invention is one that reacts with isocyanate at a rate greater than that of the undesired reaction that causes an increase in viscosity. The undesirable reactions include, for example, the further reaction of isocyanate with hydroxyl-terminated polymers (if there is still hydroxyl present); reaction of isocyanate with urethane to form allophanate; reaction of isocyanate with urea to form biuret; and reaction of the hydroxyl-terminated polymers with the alkoxysilyl group.

The isocyanate-reactive scavenging agent can be added to the reaction mixture of isocyanatosilane, hydroxyl-terminated polymer and optionally other ingredients, such as catalysts and non-protic solvents, at a desired point near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polyurethane resin can come from the di- or polyisocyanate used to chain extend the polyol, or from the isocyanatosilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product. In one embodiment of the present invention, the isocyanate-reactive scavenging agent is added to the reaction mixture at a viscosity range from about 1,000 cP to about 150,000 cP (measured at a temperature of 25° C.), and in another embodiment of the invention from about 30,000 cP to about 75,000 cP (measured at a temperature of 25° C.). In this manner, the isocyanate-reactive scavenging agent minimizes batch-to-batch variation of the final viscosity of the silylated polyurethane resin.

The isocyanate-reactive scavenging agent is allowed to react with the isocyanate-containing reaction mixture for sufficient time to ensure that all of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted and to inhibit the reaction of the residual hydroxyl groups of the hydroxyl-terminated polymer with the alkoxysilyl groups. In one embodiment of the invention, the amount of isocyanate-reactive scavenging agent added to the isocyanate-containing reaction mixture is from about 0.01 to about 5 weight percent based upon the total weight of the silylated polyurethane resin, and from about 0.01 to about 0.5 weight percent based upon the total weight of the silylated polyurethane resin in another embodiment of the invention, and in still another embodiment from about 0.02 to about 0.2 weight percent based upon the total weight of the silylated polyurethane resin.

According to one embodiment of the invention, the silylated polyurethane resin of reduced isocyanate content contains less than about 0.1 weight percent isocyanate (measured as % NCO), and in another embodiment of the invention the silylated polyurethane resin of reduced isocyanate content contains less than about 0.02 weight percent isocyanate (measured as % NCO).

The isocyanate-reactive scavenging agent can be added neat, or as a mixture with other materials. The disappearance of the isocyanate can be determined directly by analytical techniques such as infra-red spectroscopy and titration, or indirectly by the measurement of constant viscosity of the reaction mixture. The synthesis can be monitored using titration, or infrared analysis. Silylation of the urethane prepolymers is considered complete when no residual —NCO can be detected by either technique.

According to one embodiment of the invention, the isocyanate-scavenging agent is a mono-alcohol or a mixture of different mono-alcohols.

Mono-alcohols are used because they have low odor, do not contribute to the color of the silylated polyurethane resin and inhibit the reaction of residual hydroxyl-terminated polymer with the alkoxysilyl group. Other active hydrogen compounds, such as amines and organic acids, have strong odor, can form color and can catalyze the reaction of the residual hydroxyl-terminated polymer with alkoxysilyl group.

In one embodiment of the invention, the selected isocyanate-reactive scavenging agent is one that has little or no effect on the physical or cure properties of the resin, or on the properties of an adhesive, coating or sealant made from the resins disclosed herein.

The monoalkanol isocyanate-reactive scavenging agent possesses the general formula:

$$R^4\text{—OH} \tag{2}$$

in which $R^4$ is a monovalent hydrocarbon radical containing from about 1 to about 30 carbon atoms and optionally may contain a heteroatom. The heteroatom can, for example, be oxygen, which can form organofunctional groups, such as ethers, ester, and ketone groups. In another embodiment, the hydrocarbon radical is selected from the group consisting of linear, branched and cyclic alkyl, and alkenyl, aryl, arenyl and aralkyl.

Representative non-limiting examples include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethylphenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —CH$_2$OH. The mono-alcohol scavenging agents of the present invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof.

In a specific embodiment of the invention, when the terminal alkoxysilyl group of the silylated polyurethane resin is a methoxysilyl the specific isocyanate-reactive scavenging agent is methanol. In another specific embodiment of the invention, when the terminal alkoxysilyl group of the silylated polyurethane resin is an ethoxysilyl, the specific isocyanate-reactive scavenging agent is ethanol.

In one embodiment of the invention, the silylated polyurethane resin of reduced isocyanate content resulting from the process disclosed herein, following aging, has specifically a viscosity of about 1,000 cP to about 150,000 cP, more specifically from about 30,000 cP to about 75,000 cP and most specifically from about 35,000 cP to about 65,000 cP.

Catalysts typically used in the preparation of the above mentioned hydroxyl-terminated polyurethane prepolymers can also be used to catalyze the reaction of the isocyanatosilane with the hydroxyl-terminated polymer and include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts used for making polyurethane prepolymer are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as MoO$_2$++, UO$_2$++, and the like; alcholates and phenolates of various metals such as Ti(OR)$_4$, Sn(OR)$_4$, Sn(OR)$_2$, Al(OR)$_3$, Bi(OR)$_3$ and the like, wherein R is alkyl or aryl of from 1 to about 18 carbon atoms, and reaction products of alcoholates of various metals with carboxylic acids, beta-diketones, and 2-(N,N-dialkylamino)alkanols, such as well known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

In one aspect of the present invention, the catalyst is a metal catalyst. In another aspect of the present invention, the metal catalyst is selected from the group consisting of tin compounds, and in yet another aspect of the invention, the metal catalyst is dibutyltin dilaurate.

Still another aspect of the invention is directed to curable silylated polyurethane resin composition comprising at least one curable silylated polyurethane resin made from the process of the invention and at least one additional ingredient selected from the group consisting of plasticizers, resins, defoamers, UV stabilizers, viscosity controllers, thixotropic agents, cure catalysts, fragrances, dyes, fillers, preservative, antioxidants, carbon black, titanium oxide, clays, surface treated silicas and mixtures thereof. This list, however, is not comprehensive and is given merely as illustrative.

Antioxidants that may be added to the polymers to provide protection against oxidative changes. The quantities in which such additives are used vary within wide limits, i.e. from 0.01 to 100% by weight and, more particularly, from 0.01 to 30% by weight, based on the silylated polyurethane resin.

The curable silylated polyurethane resin composition made from silylated polyurethane resin by the process of the invention can be used as adhesives, sealants, coatings, gaskets, industrial rubber goods, and the like. For formulation in sealant compositions, the silylated resin compositions of the present invention are combined with fillers and additives known in the prior art for use in elastomeric compositions. By the addition of such materials, physical properties such as viscosity, flow rate, sag, and the like can be modified.

In order to illustrate various illustrative embodiments of the present inventions, the following examples are provided.

EXAMPLES

The stability of polyurethane resins with and without residual isocyanate is demonstrated in the examples below. The viscosities were measured at 25° C. on a Brookfield RVDV-II+ cone and plate viscometer.

Comparative Example 1

The silylated polyurethane resin with residual isocyanate groups was made by a batch process. Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35 µL), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene glycol)dimethyl ether). The mixture was reacted until the viscosity was 24,000 cP and the isocyanate concentration was 0.08%, at which point was added 3-isocyanatopropyltrimethoxysilane (GE Silicones, Silquest® A-Link™ 35, 302.3 g). Heating was continued until the reaction mixture reached viscosity 53,000 cP and isocyanate concentration 0.05%, when the heat was turned off and the reaction was allowed to cool slowly. When the reaction temperature dropped to 65° C. (123 minutes after turning off heat to the reactor) the viscosity was 63,000 cP and the isocyanate concentration was 0.04%, vinyltrimethoxysilane (GE Silicones, Silquest A-171®, 302.2 g) was added. At 55° C. (after a further 67 minutes) the viscosity was 50,000 cP and the isocyanate concentration was 0.04%, when the reaction was considered complete and the product was drained from the reactor. A peak for NCO was detected in the IR spectrum of the product.

Comparative Example 2

The silylated polyurethane resin with residual isocyanate groups was made by a batch process. Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35 µL), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene glycol)dimethyl ether). The mixture was reacted until the viscosity was 28,000 cP and the isocyanate concentration was 0.07%, at which point was added 3-isocyanatopropyltrimethoxysilane (General Electric Advanced Materials, Silquest® A-Link™ 35, 302.3 g). The reaction was continued until the reaction mixture reached viscosity 55,000 cP and isocyanate concentration 0.06%, when vinyltrimethoxysilane (General Electric Advanced Materials, Silquest A-171®, 302.2 g) was added. Ten minutes after the addition of the vinyltrimethoxysilane the viscosity was 40,000 cP, at which point the reaction temperature set point was lowered to 80° C. After a further period of 170 minutes the viscosity was 59,000 cP and then the reaction temperature set point was lowered to 50° C. After another 853 minutes the viscosity of the reaction mixture was 78,000 cP and the isocyanate concentration was 0.00%. The reaction was considered complete and the product was drained from the reactor.

Example 3

The silylated polyurethane resin with isocyanate-reactive scavenging agent was made by a batch process. Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35 µL), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene)glycol dimethyl ether). The mixture was reacted until the viscosity was 22,000 cP and the isocyanate concentration was 0.10%, at which point was added 3-isocyanatopropyltrimethoxysilane (General Electric Advanced Materials, Silquest® A-Link™ 35, 302.3 g). The reaction was continued until the reaction mixture reached viscosity 52,000 cP and isocyanate concentration 0.07%, when methanol (9.21 g, 0.06 wt %, stoichiometric equivalent of 0.08% NCO) was added. After a further 37 minutes the reaction temperature set point was lowered to 80° C., then after another 81 minutes the viscosity was 49,000 cP and the isocyanate concentration was 0.04%, and vinyltrimethoxysilane (General Electric Advanced Materials, Silquest A-171®, 302.2 g) was added. Twenty-three minutes after the addition of the vinyltrimethoxysilane the viscosity was 42,000 cP, at which point the reaction temperature set point was lowered to 50° C. After another 920 minutes the viscosity of the reaction mixture was 41,000 cP and the isocyanate concentration was 0.02%. No peak for NCO was detected in the IR spectrum of the product. The reaction was considered complete and the product was drained from the reactor.

Example 4

The silylated polyurethane resin with isocyanate-reactive scavenging agent was made by a batch process. Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35 µL), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene)glycol dimethyl ether). The mixture was reacted until the viscosity was 20,000 cP and the isocyanate concentration was 0.10%, at which point was added 3-isocyanatopropyltrimethoxysilane (General Electric Advanced Materials, Silquest® A-Link™ 35, 302.3 g). The reaction was continued until the reaction mixture reached viscosity 47,000 cP and isocyanate concentration 0.06%, when methanol (18.4 g, 0.12 wt %, stoichiometric equivalent of 0.16% NCO) was added and the reaction temperature set point was lowered to 80° C. After another 136 minutes the viscosity was 48,000 cP and the isocyanate concentration was 0.01%, and vinyltrimethoxysilane (GE Silicones, Silquest A-171®, 302.2 g) was added after a further 46 minutes. Twenty-nine minutes after the addition of the vinyltrimethoxysilane the viscosity was 38,000 cP, at which point the reaction temperature set point was lowered to 50° C. After another 1103 minutes the viscosity of the reaction mixture was 38,000 cP and the isocyanate concentration was 0.00%. No peak for NCO was detected in the IR spectrum of the product. The reaction was considered complete and the product was drained from the reactor.

Example 5

The silylated polyurethane resin with isocyanate-reactive scavenging agent was made by a batch process. Into a 22 L reactor were charged Acclaim® 12200N polyol (Bayer, OH #10.2 mgKOH/g, 14600 g) and Irganox® 1135 (Ciba, 73 g). The mixture was sparged with nitrogen at 85° C. for 16 hours. While maintaining the reaction temperature at 85° C., sequentially were added 85% phosphoric acid (35 μL), isophorone diisocyanate (Bayer, Desmodur® I, 147.5 g) and dibutyltin dilaurate (General Electric Advanced Materials, Fomrez® Catalyst SUL-4, 7.77 g of a 10 wt % solution in di(propylene)glycol dimethyl ether). The mixture was reacted until the viscosity was 27,000 cP and the isocyanate concentration was 0.07%, at which point was added 3-isocyanatopropyltrimethoxysilane (General Electric Advanced Materials, Silquest® A-Link™ 35, 302.3 g). The reaction was continued until the reaction mixture reached viscosity 57,000 cP and isocyanate concentration 0.05%, when a mixture of methanol (18.4 g, 0.12 wt %, stoichiometric equivalent of 0.16% NCO) and vinyltrimethoxysilane (General Electric Advanced Materials, Silquest A-171®, 302.2 g) was added and the reaction temperature set point was lowered to 80° C. After another 25 minutes the viscosity was 44,000 cP and the isocyanate concentration was 0.02%. The reaction mixture was held at 80° C. for a further 269 minutes and then the reaction temperature set point was lowered to 50° C. After another 975 minutes the viscosity of the reaction mixture was 45,000 cP and the isocyanate concentration was 0.00%. The reaction was considered complete and the product was drained from the reactor.

Comparative Example 6

The silylated polyurethane resin with isocyanate-reactive scavenging agent was made by a batch process. Into a 1 L reactor were charged Acclaim® 12200 polyol (Bayer, OH #9.3 mgKOH/g, 500 g) and Irganox® 1135 (Ciba, 2.5 g). The mixture was sparged with nitrogen at 80° C. for 16 hours. While maintaining the reaction temperature at 80° C., sequentially were added monomeric diphenylmethane diisocyanate (Bayer, Mondur® ML, 4.61 g), 3-isocyanatopropyltrimethoxysilane (General Electric Advanced Materials, Silquest® A-Link™ 35, 9.45 g) and dibutyltin dilaurate (General Electric Advanced Materials, Fomrez® Catalyst SUL-4, 0.27 g of a 10 wt % solution in di(propylene) glycol dimethyl ether). The mixture was reacted until the viscosity was 54,000 cP and the isocyanate concentration was 0.06%, at which point vinyltrimethoxysilane (General Electric Advanced Materials, Silquest A-171®, 10.0 g) was added and the reactor was cooled to room temperature. By the time the reaction was cooled to room temperature the viscosity was 59,000 cP and the isocyanate concentration was 0.04%, when the reaction was considered complete and the product was drained from the reactor. A peak for NCO was detected in the IR spectrum of the product.

Example 7

The silylated polyurethane resin with isocyanate-reactive scavenging agent was made by a batch process. Into a 1 L reactor were charged Acclaim® 12200 polyol (Bayer, OH #9.3 mgKOH/g, 500 g) and Irganox® 1135 (Ciba, 2.5 g). The mixture was sparged with nitrogen at 80° C. for 16 hours. While maintaining the reaction temperature at 80° C., sequentially were added monomeric diphenylmethane diisocyanate (Bayer, Mondur® ML, 4.61 g), 3-isocyanatopropyltrimethoxysilane (General Electric Advanced Materials, Silquest® A-Link™ 35, 9.45 g) and dibutyltin dilaurate (General Electric Advanced Materials, Fomrez® Catalyst SUL-4, 0.27 g of a 10 wt % solution in di(propylene)glycol dimethyl ether). The mixture was reacted until the viscosity was 63,000 cP and the isocyanate concentration was 0.06%, at which point a mixture of methanol (0.60 g) and vinyltrimethoxysilane (General Electric Advanced Materials, Silquest A-171®, 9.94 g) was added. After two hours at 80° C. the reaction was cooled to room temperature when the viscosity was 59,000 cP and the isocyanate concentration was 0.01%. The reaction was considered complete and the product was drained from the reactor. No peak for NCO was detected in the IR spectrum of the product.

Comparative Example 8

The silylated polyurethane resin with residual isocyanate groups in ethyl acetate was made by a batch process. Into a 130 gal reactor were charged Poly Bd® R-20LM (Sartomer, 16 kg), Krasol®LBH-P2000 (Sartomer, 35 kg), Krasol®LBH-P5000 (Sartomer, 71 kg), ethyl acetate (189 kg), dimethyltin di-neodecanoate (General Electric Advanced Materials, Fomrez® Catalyst UL-28, 100 g of a 10 wt % solution in ethyl acetate) and isophorone diisocyanate (Bayer, Desmodur® I, 9 kg). The mixture was heated at 75° C. until the isocyanate concentration had dropped to 0.02% when 3-isocyanatopropyltrimethoxysilane (General Electric Advanced Materials, Silquest® A-Link™ 35, 1 kg) was charged. The mixture was heated further until the isocyanate concentration had dropped to 0.02% when ethyl acetate (15 kg) was charged and the resulting product was discharged from the reactor. An aliquot (226 g) of the silylated polyurethane resin in ethyl acetate produced above (viscosity 7800 cP, isocyanate content 0.02%) was heated at 75° C. for 2 hours in a 500 mL glass reactor equipped with a mechanical agitator and condenser. After heating the product had viscosity 9900 cP and isocyanate content 0.01%.

Example 9

The silylated polyurethane resin with isocyanate-reactive scavenging agent was made by a batch process. An aliquot (220 g) of the silylated polyurethane resin in ethyl acetate produced in Comparative Example 8 (viscosity 7800 cP, isocyanate content 0.02%) and methanol (0.13 g) were heated at 75° C. for 2 hours in a 500 mL glass reactor equipped with a mechanical agitator and condenser. After heating the product had viscosity 7900 cP and isocyanate content 0.00%. It can be seen that methanol reacts with residual isocyanate in this silylated polyurethane resin giving a product that is more stable to viscosity build than the resin in Comparative Example 8.

Demonstration of Improved Viscosity Stability:

The viscosity stability of a silylated polyurethane resin during manufacture is demonstrated graphically in FIG. 1. The viscosity profile of Comparative Example 2 (prepared without the use of an isocyanate-reactive scavenging agent) shows continued viscosity build, whereas the viscosity profiles of Examples 4 and 5 (prepared with the use of an isocyanate-reactive scavenging agent) show stable viscosity after addition of methanol, whether added by itself, or when mixed with A-171.

Figure 2:
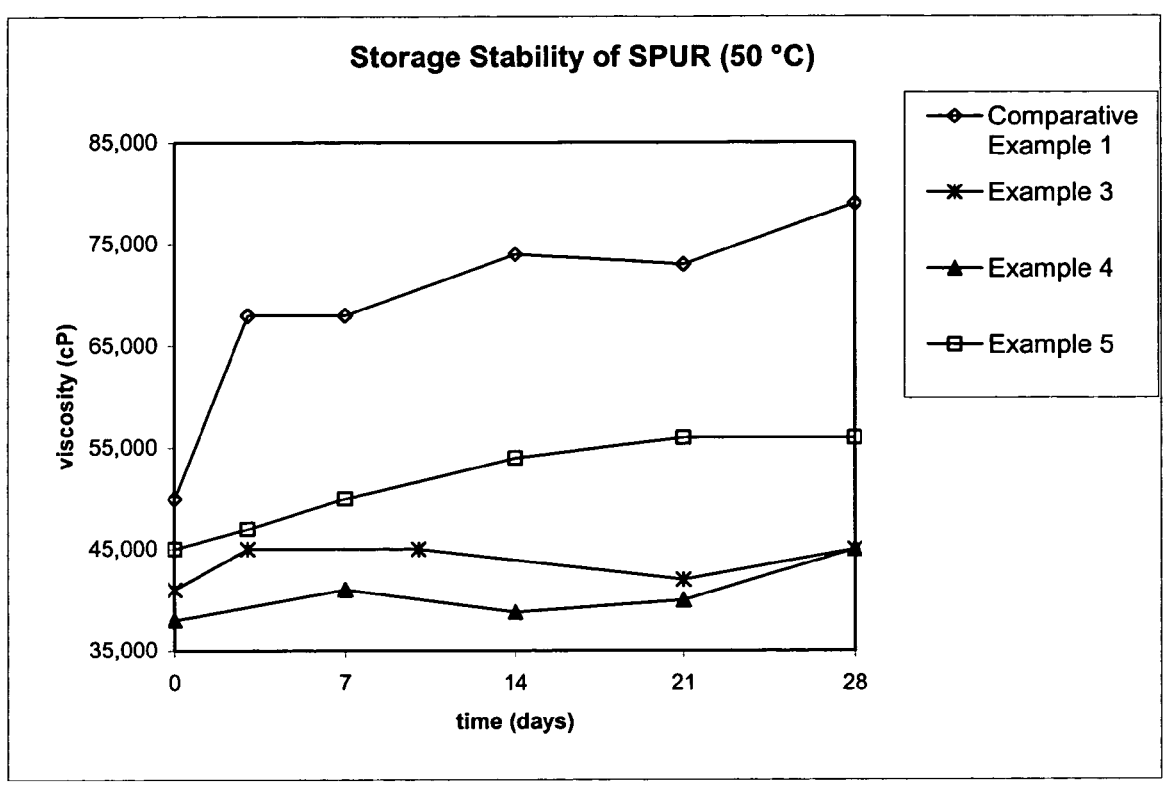
FIG. 2 is a graphical representation of the viscosity stability of silylated polyurethane resins of Comparative Example 1 and Examples 3, 4 and 5.

The viscosity stability of a silylated polyurethane resin during storage is demonstrated graphically in FIG. 2. After preparation of the resins samples were stored in an oven at 50° C. and the viscosity of the samples was measured periodically. The viscosity profile of Comparative Example 1 (prepared without the use of an isocyanate-reactive scavenging agent) shows continued viscosity build on storage, while the viscosity profiles of Examples 3, 4 and 5 (prepared with the use of an isocyanate-reactive scavenging agent) show more stable viscosity over the same period of time.

Figure 3:
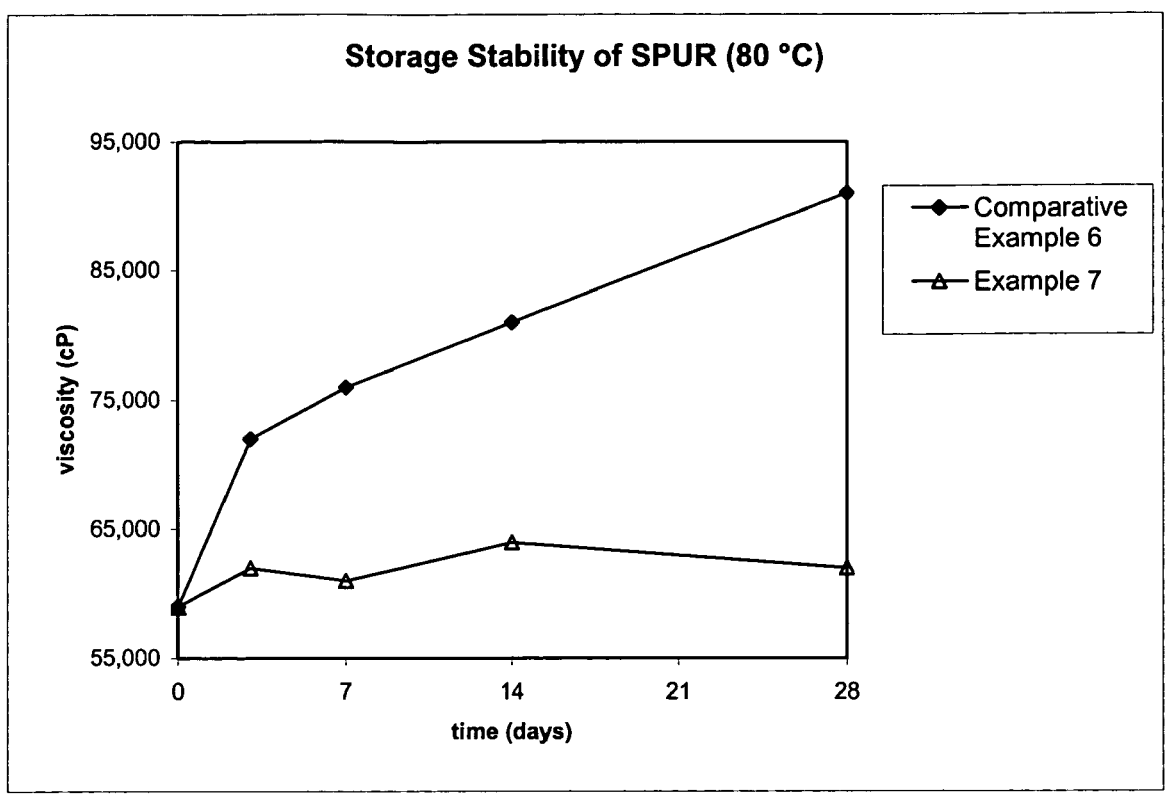
FIG. 3 is a graphical representation of the storage stability of silylated polyurethane resins of Comparative Example 6 and Example 7.

The storage stability of silylated resins prepared using diphenylmethane diisocyanate is shown in FIG. 3. Samples of the resins of Comparative Example 6 and Example 7 were stored in an oven at 80° C. and the viscosity of the samples was measured periodically. The viscosity of the sample of Comparative Example 6 (prepared without the use of an isocyanate-reactive scavenging agent) continued to increase on storage, whereas the viscosity of the sample of Example 7 (prepared with the use of an isocyanate-reactive scavenging agent) was more stable over the same period of time.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A process for preparing a curable silylated polyurethane resin which comprises:
    a) silylating hydroxyl-terminated polyurethane polymer obtained from the reaction of polyol with di-isocyanate and/or polyisocyanate and optionally containing residual di-isocyanate and/or polyisocyanate with isocyanatosilane under anhydrous conditions to provide silylated polyurethane possessing residual hydroxyl groups and containing residual isocyanate selected from the group consisting of di-isocyanate, polyisocyanate and isocyanatosilane: and,
    b) scavenging residual isocyanate present in the silylated polyurethane with at least one isocyanate-reactive scavenging agent to provide silylated polyurethane resin of reduced isocyanate content,
        the silylated polyurethane resin of reduced isocyanate content resulting from step (b) possessing a viscosity following aging which is less than that of the isocyanate-containing silylated polyurethane resin resulting from step (a) following the same conditions of aging.

2. The process of claim 1 wherein the silylated polyurethane resin of reduced isocyanate content resulting from step (b) following aging possesses a viscosity which is about 10 percent less than that of the isocyanate-containing silylated polyurethane resin resulting from step (a) following the same conditions of aging.

3. The curable silylated polyurethane resin of reduced isocyanate content resulting front the process of claim 2.

4. The process of claim 1 wherein the silylated polyurethane resin of reduced isocyanate content resulting from step (b) following aging possesses a viscosity which is about 60 percent less than that of the isocyanate-containing silylated polyurethane resin resulting from step (a) following the same conditions of aging.

5. The curable silylated polyurethane resin of reduced isocyanate content resulting from the process of claim 4.

6. The process of claim 1 wherein the hydroxyl-terminated polyurethane polymer is obtained from at least one polyol selected from the group consisting of polyether polyols, polyester polyols polyetherester polyols, polyesterether polyols, and polybutadiene polyols.

7. The process of claim 1 wherein the polyol possesses a number average molecular weights from about 500 to about 25,000 grams per mole.

8. The process of claim 7 wherein the polyol possesses a number average molecular weights from about 1,000 to about 20,000 grams per mole.

9. The process of claim 1 wherein the silylated polyurethane contains from about 0.01 to about 0.30 weight percent isocyanate.

10. The process of claim 1 wherein the silylated polyurethane contains from about 0.01 to about 0.15 weight percent isocyanate.

11. The process of claim 10 wherein $R^1$ is selected from the group consisting of methylene, ethylene, propylene, butylenes, isobutylene, 3-oxa-hexylene, dodecylene, phenylene, 1,4-bis-(methylene)benzene, 1,4-bis-(ethylene)benzene.

12. The process of claim 1 wherein the isocyanatosilane possesses the general formula:

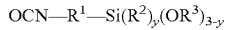

$$OCN-R^1-Si(R^2)_y(OR^3)_{3-y}$$

wherein $R^1$ is a divalent hydrocarbon radical containing from about 1 to about 12 carbon atoms, optionally containing one or more heteroatoms, each $R^2$ is the same or different monovalent hydrocarbon radical of from about 1 to about 8 carbon atoms, each $R^3$ is the same or different monovalent hydrocarbon radical alkyl group of up to 6 carbon atoms and y is 0, 1 or 2.

13. The process of claim 10 wherein $R^2$ and $R^3$ are selected from the group consisting of methyl, ethyl, propyl, isopropyl, tert-butyl, hexyl, octyl, phenyl, 4-ethylphenyl, benzyl, and 2-phenylethyl.

14. The process of claim 1 wherein the isocyanatosilane is selected from the group consisting of 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanatomethyltrimethoxysilane, 3-isocyanatopropyltriethoxysilane, 2-isocyanato-2-methylethyltriethoxysilane, 4-isocyanatobutyltriethoxysilane, 2-isocyanato-1,1-dimethylethyltriethoxysilane, 1-isocyanatomethyltriethoxysilane, 3-isocyanatopropylmethyldimethoxysilane, 3-isocyanatopropyldimethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane, 1-isocyanatomethylmethyldiethoxysilane, and mixtures thereof.

15. The process of claim 14 wherein the mono-alcohol possesses the general formula:

$$R^4-OH$$

wherein R4 is a monovalent hydrocarbon radical containing from about 1 to about 30 carbon atoms, and optionally, contains a heteroatom.

16. The process of claim 15 wherein the alkyl hydrocarbon radical is selected from the group consisting of methyl, ethyl, propyl, isopropyl, butyl, pentyl, dodecyl, cyclohexyl, cyclopentyl, and 3-methylhexyl, and the alkenyl hydrocarbon radical is selected from the group consisting of vinyl, allyl, and methallyl, and the aryl hydrocarbon radical is phenyl, and the arenyl hydrocarbon radical is selected from the group consisting of 4-methylphenyl, 2,4-dimethylphenyl and 2,4,6-trimethylphenyl, and the aralkyl hydrocarbon radical is selected from the group consisting of benzyl and 2-phenylethyl.

17. The process of claim 1 wherein the isocyanate-reactive scavenging agent is a mono-alcohol or a mixture of mono-alcohols.

18. The process of claim 17 wherein the hydrocarbon radical is selected from the group consisting of linear alkyl, branched alkyl, cyclic alkyl, alkenyl, aryl, arenyl, aralkyl and mixtures thereof.

19. The process of claim 18 wherein the monoalkanol is at least one member selected from the group consisting of methanol, ethanol, n-propanol, isopropanol, n-butanol, sec-butanol and tert-butanol.

20. The process of claim 1 wherein the isocyanate-reactive scavenging agent is methanol when the polyurethane prepolymer is silylated with methoxysilane.

21. The process of claim 1 wherein the isocyanate-reactive scavenging agent is ethanol when the polyurethane prepolymer is silylated with ethoxysilane.

22. The process of claim 1 wherein the silylated polyurethane resin of reduced isocyanate content contains less than about 0.1 weight percent isocyanate.

23. The process of claim 1 wherein the silylated polyurethane resin of reduced isocyanate content contains less than about 0.02 weight percent isocyanate.

24. The curable silylated polyurethane resin of reduced isocyanate content resulting from the process of claim 1.

* * * * *